US009612584B2

(12) United States Patent
Sakuma et al.

(10) Patent No.: US 9,612,584 B2
(45) Date of Patent: Apr. 4, 2017

(54) ELECTRIC POWER GRID CONTROL SYSTEM AND METHOD FOR ELECTRIC POWER CONTROL (75) Inventors: Hisato Sakuma, Tokyo (JP); Koji Kudo, Tokyo (JP); Hitoshi Yano, Tokyo (JP)

(73) Assignee: NEC CORPORATION, Tokyo (JP)

(*) Notice: Subject to any disclaimer, the term of this patent is extended or adjusted under 35 U.S.C. 154(b) by 797 days.

(21) Appl. No.: 13/823,594

(22) PCT Filed: Nov. 8, 2011

(86) PCT No.: PCT/JP2011/075676
§ 371 (c)(1),
(2), (4) Date: Mar. 14, 2013

(87) PCT Pub. No.: WO2012/063800
PCT Pub. Date: May 18, 2012

(65) Prior Publication Data
US 2013/0184894 A1 Jul. 18, 2013

(30) Foreign Application Priority Data
Nov. 8, 2010 (JP) ................... 2010-249745

(51) Int. Cl.
G05D 11/00 (2006.01)
G05D 5/00 (2006.01)
(Continued)

(52) U.S. Cl.
CPC ............... G05B 13/02 (2013.01); H02J 3/12 (2013.01); H02J 3/16 (2013.01); H02J 3/381 (2013.01); H02J 3/46 (2013.01); Y02E 40/34 (2013.01)

(58) Field of Classification Search
USPC .......... 700/286–300, 60; 322/8; 307/84, 18, 307/153; 290/44
See application file for complete search history.

(56) References Cited

U.S. PATENT DOCUMENTS

2007/0100506 A1* 5/2007 Teichmann ............... H02J 3/24
700/297
2009/0146501 A1* 6/2009 Cyrus ..................... H02J 3/383
307/84

(Continued)

FOREIGN PATENT DOCUMENTS

JP 11-308771 A 11/1999
JP 2001-352682 A 12/2001

(Continued)

OTHER PUBLICATIONS

"Guidelines for System Linking Technology Relating to Ensuring Power Quality", Agency of Natural Resources and Energy, Oct. 1, 2004. http://www.meti.go.jp/policy/tsutatsutou/tuuti1/aa501.pdf.

(Continued)

Primary Examiner — Mohammad Ali
Assistant Examiner — Md Azad
(74) Attorney, Agent, or Firm — Sughrue Mion, PLLC (57) ABSTRACT An electric power grid control system is provided with: distributed generators connected to an electric power grid; and voltage measurement units that measure voltage at connection points of the distributed generators to the electric power grid. When voltage at a connection point to the electric power grid deviates from a predetermined acceptable range, a centralized control device equally allocates a voltage adjustment amount for returning the voltage to the acceptable range to all distributed generators belonging to a predetermined group that was set in advance. Distribution processing devices cause the distributed generators to adjust voltage at the connection points in accordance with the voltage adjustment amount allocated from the centralized control device.

10 Claims, 5 Drawing Sheets (51) Int. Cl.

| | |
|---|---|
| G05D 3/12 | (2006.01) |
| G05D 9/00 | (2006.01) |
| G05D 23/00 | (2006.01) |
| G05B 19/18 | (2006.01) |
| F03D 9/00 | (2016.01) |
| H02J 1/00 | (2006.01) |
| H02J 3/00 | (2006.01) |
| G05B 13/02 | (2006.01) |
| H02J 3/12 | (2006.01) |
| H02J 3/16 | (2006.01) |
| H02J 3/46 | (2006.01) |
| H02J 3/38 | (2006.01) |

(56) References Cited

U.S. PATENT DOCUMENTS

| | | | |
|---|---|---|---|
| 2010/0025994 A1* | 2/2010 | Cardinal | F03D 7/0284 290/44 |
| 2010/0094474 A1* | 4/2010 | Larsen | F03D 9/003 700/287 |
| 2010/0213762 A1 | 8/2010 | Itoh et al. | |
| 2011/0106321 A1* | 5/2011 | Cherian | H02J 3/00 700/286 |

FOREIGN PATENT DOCUMENTS

| | | |
|---|---|---|
| JP | 2002-152976 A | 5/2002 |
| JP | 2006-121853 A | 5/2006 |
| JP | 2007-74846 A | 3/2007 |
| JP | 2007-267600 A | 10/2007 |
| JP | 2007-288877 A | 11/2007 |
| JP | 2009-153333 A | 7/2009 |
| JP | 2009-239990 A | 10/2009 |
| JP | 2010-200539 A | 9/2010 |
| JP | 2010-213542 A | 9/2010 |
| JP | 2012-85460 A | 4/2012 |

OTHER PUBLICATIONS

Hiroyuki Hatta, et al., "Control of Decrease of Output Power of Distributed Power Generation caused by Voltage Regulation—Remote Control Method for Sharing Reactive Power" Central Research Institute of Electric Power Industry, Research Report R06011, Jun. 2007.

Takao Tsuji, et al., "A Study of Autonomous Decentralized Voltage Profile Control of Distribution Network considering Economic Efficiency," IEEJ Transactions B, (2008), pp. 174-185, vol. 128, No. 1.

Communication dated Aug. 16, 2016, from the Japanese Patent Office in counterpart Japanese application No. 2012-542922.

Communication dated May 17, 2016 from Japanese Patent Office in counterpart Application No. 2015-147686.

* cited by examiner

ELECTRIC POWER GRID CONTROL SYSTEM AND METHOD FOR ELECTRIC POWER CONTROL

CROSS REFERENCE TO RELATED APPLICATIONS

This application is a National Stage of International Application No. PCT/JP2011/075676 filed Nov. 8, 2011, claiming priority based on Japanese Patent Application No. 2010-249745 filed Nov. 8, 2010, the contents of all of which are incorporated herein by reference in their entirety.

TECHNICAL FIELD

The present invention relates to an electric power grid control system and a method for controlling the voltage of an electric power grid to which are linked a plurality of distributed generators.

BACKGROUND ART

In recent years, the introduction of Distributed Generators (DG), of which photovoltaic (PV) systems are representative, has been advanced due to environmental issues and the decreasing of dependence on fossil fuels.

Most distributed generators are linked to distribution power lines for distributing electric power that is supplied from distribution substations to industries, public facilities, private residences, and multiple-family dwellings (hereinbelow collectively referred to as "consumers"). For example, in a PV system, direct-current power that is generated by a photovoltaic panel is converted to an alternating current voltage appropriate for an electric power grid and supplied to distribution lines by means of a PCS (Power Conditioning System).

A distributed generator is usually independently managed by a relatively small-scale industry or user, and linking a multiplicity of such distributed generators to an electric power grid introduces the potential for disturbance of the electric power grid. The Agency for Natural Resources and Energy has therefore indicated guidelines for linking a distributed generator to an electric power grid (See Non-Patent Document 1).

One disturbance that occurs with the spread of distributed generators is the problem of voltage deviation. According to Non-Patent Document 1, distribution line voltage that is supplied to a low-voltage consumer must be maintained within the range of 101±6V for a standard voltage of 100V and must be maintained within a range of 202±20V for a standard voltage of 200V.

An electric power grid is made up by high-voltage distribution lines for transmitting high-voltage electric power that is supplied from the distribution transformer of an electric power substation and low-voltage distribution lines for transmitting low-voltage electric power that has been converted from high voltage to low voltage by pole transformers, each consumer typically being connected to a low-voltage distribution line. These distribution lines are connected in a radiating form so as not to form a loop, and in a conventional electric power grid in which only the load is connected, voltage is assumed to drop for the remote ends of the low-voltage distribution lines that are connected in a radiating form, and lines are therefore designed such that voltage does not deviate from the proper range even for the ends of the low-voltage distribution lines.

Nevertheless, the connection of a distributed generator to an electric power grid results in a decrease in the current that is supplied from the electric power grid to the consumer that is equipped with the distributed generator, whereby the distribution line voltage increases and thus deviates from the acceptable range. In addition, selling surplus electric power that has been generated by a distributed generator back to the electric power company results in the phenomenon called "reverse power flow" in which current flows from the consumer in the direction of the pole transformer, and this reverse power flow increases the potential for deviation from the acceptable range due to the increase in the distribution line voltage that increases with the remoteness on the low-voltage distribution line. The tendency for deviation from the acceptable range of the distribution line voltage differs according to location, the occurrence of voltage deviation becoming more likely with increasing remoteness on a low-voltage distribution line and the occurrence of voltage deviation on a high-voltage distribution line also becoming more likely with increasing remoteness. In addition, the distribution line voltage is in some cases originally set high by the turn ratio of pole transformers on a low-voltage distribution line, and distribution line voltage is therefore prone to deviation from the acceptable range on this type of low-voltage distribution line as well. Still further, when a high-volume distributed generator is linked to any point of a low-voltage distribution line or high-voltage distribution line, the distribution line voltage is prone to deviation from the acceptable range in the vicinity of the connection point.

To avoid this problem of voltage deviation, a distributed generator is required to be equipped with functions for autonomously suppressing voltage increase that are referred to as active power control (P control) and reactive power control (Q control).

According to Non-Patent Document 1, when the distribution line voltage at a connection point exceeds 107V, which is the upper limit of the acceptable range, a distributed generator is required to decrease the distribution line voltage by supplying a phase-advance reactive power (Q control) until the power factor falls to 85%, and if the distribution line voltage still does not return to within the acceptable range, is required to suppress the generated amount (P control).

However, because the suppression of voltage increase by means of Q control by a distributed generator alone has little effect, and moreover, because adding Q control capability to PCS is costly, many PCS lack Q control capability. In such cases, the distributed generator immediately initiates P control when the distribution line voltage exceeds the acceptable range at the connection point, As described hereinabove, because the locations prone to the occurrence of voltage deviation such as the ends of low-voltage distribution lines are fixed, control for suppressing voltage increase (hereinbelow referred to as voltage suppression control) is concentrated among the portion of consumers for whom distributed generators are linked to such locations.

Voltage suppression control incurs losses for a consumer due to increase in costs arising from providing Q control capability in a PCS, the deterioration of PCS due to the use of P control function and Q control function, and decrease of the amount of electricity that is sold back due to limitation of the amount of generated power. The concentration of these losses among a portion of consumers raises problems, and these problems are exacerbated by the occurrence of inequalities among consumers who are relatively close, for example, connected to the same pole transformer and among consumers whose power generation conditions, such as weather, are identical.

One example of a method for solving the inequality of the concentration of losses to a portion of consumers while still avoiding the problem of voltage deviation is proposed in Non-Patent Document 2, this being a method of, when voltage deviation occurs, instructing the output of reactive power to all PCS linked to the high-voltage distribution line to which is connected the low-voltage distribution line in which the voltage deviation occurred.

However, in the method proposed in Non-Patent Document 2, because a PCS lacking Q control capability simply does not carry out voltage suppression control, consumers equipped with PCS that lack Q control capability and consumers equipped with PCS that have Q control capability are treated unequally. In addition, even when the amount of control (amount of voltage adjustment) for suppressing a voltage increase by any consumer is the same, the amount of change in the distribution line voltage at the connection points of other consumers typically differs according to the location of connection of distributed generators in which control is implemented. As a result, equal allocation of Q control to PCS that are linked at locations for which the effect of suppressing voltage increase is limited as proposed by Non-Patent Document 2 results in a great increase of the total amount of voltage adjustment for suppressing an increase in voltage, whereby an increase in voltage cannot be effectively suppressed. As described hereinabove, voltage suppression control incurs losses for consumers, and limiting to the utmost the amount of voltage adjustment to suppress a voltage increase is therefore to be desired. In addition, the suppression of a voltage increase by Q control typically incurs great power distribution loss, whereby loss suffered by electric power companies also increases. As a result, the total amount of Q control that results from each distributed generator for suppressing a voltage increase should be limited as much as possible.

According to one method that has been considered for solving the inequality of the concentration of losses to a portion of consumers and for further decreasing the total amount of voltage adjustment to suppress a voltage increase while still avoiding the problem of voltage deviation, the burden of large voltage adjustment amounts is placed on PCS that are linked at positions for which the effect of suppressing an increase in voltage is great, and losses resulting from the inequality of voltage adjustment amounts are compensated by fees. For example, Non-Patent Document 3 proposes the payment of an incentive to each consumer that is equipped with a distributed generator according to the amount of reactive power output from each distributed generator. This method, however, entails the problem that many issues, such as the deterioration of PCS caused by the use of P control function and Q control function, must be considered, and determining the incentives that can resolve inequalities is therefore problematic.

In the electric power grid control systems of the background art described hereinabove, the problem remains that inequality occurs due to concentrating voltage suppression control in a portion of the consumers when voltage suppression control is performed by distributed generators due to such issues as the locations of connection of distributed generators to the electric power grid and whether an owned PCS has Q control capability or not.

In addition, a method of causing all PCS that are linked to high-voltage distribution lines to which is connected a low-voltage distribution line in which voltage deviation has occurred to supply reactive power is not capable of resolving the inequalities among consumers because voltage suppression control does not have to be implemented in PCS that lack Q control capability. In addition, this method is not capable of effectively suppressing a voltage increase because the total voltage adjustment amount required to suppress the voltage resulting from each distributed generator is great.

Still further, a method in which losses that result from inequalities of the amounts of voltage adjustment are compensated for by money suffers from the problem of the difficulty of determining incentives that can resolve inequalities.

RELATED ART DOCUMENT

Non-Patent Documents

Non-Patent Document 1: Agency of Natural Resources and Energy, "Guidelines for System Linking Technology Relating to Ensuring Power Quality" Oct. 1, 2004. http://www.meti.go.jp/policy/tsutatsutou/tuuti1/aa501.pdf Non-Patent Document 2: Hatta Hiroyuki, Kobayashi Hiromu, "Control of Decrease of Output Power of Distributed Power Generation caused by Voltage Regulation—Reactive Power Sharing by Remote Information." Central Research Institute of Electric Power Industry, Research Report R06011, June 2007.

Non-Patent Document 3: Tsuji Takao, et al., "Autonomous Distributed Voltage Distribution Control Method of Future Power Systems that Considers Economy," IEEJ Transactions B, Vol. 128, No. 1, pp. 174-185 (2008)

SUMMARY

It is therefore an object of the present invention to provide an electric power grid control system and electric power grid control method that can efficiently avoid voltage deviation while resolving inequality in voltage suppression control among neighboring consumers.

The electric power grid control system according to an exemplary aspect of the present invention for achieving the above-described object includes:

distributed generators that are connected to an electric power grid;

voltage measurement units that measure voltage of connection points of the distributed generators to the electric power grid;

a centralized control device that, when voltage at a connection point deviates from a predetermined acceptable range, equally allocates a voltage adjustment amount for returning the voltage to the acceptable range to all of the distributed generators within a predetermined group that has been set in advance; and distribution processing devices that cause the distributed generators to adjust voltage at the connection points in accordance with the voltage adjustment amount that was allocated from the centralized control device.

The electric power grid control method according to an exemplary aspect of the present invention is an electric power grid control method of an electric power grid control system that is equipped with distributed generators that are connected to an electric power grid and a voltage measurement unit that measures voltage of the connection points of the distributed generators to the electric power grid, the method including steps of:

when the voltage at a connection point deviates from a predetermined acceptable range, equally allocating a voltage adjustment amount for returning the voltage to the acceptable range to all of the distributed generators that belong to a predetermined group that is set in advance; and causing the distributed generators to adjust voltage at the connection points in accordance with the voltage adjustment amount that was allocated.

EXEMPLARY EMBODIMENT

The present invention is next described using the accompanying drawings.

The principles of the present invention are first explained.

Figure 1:
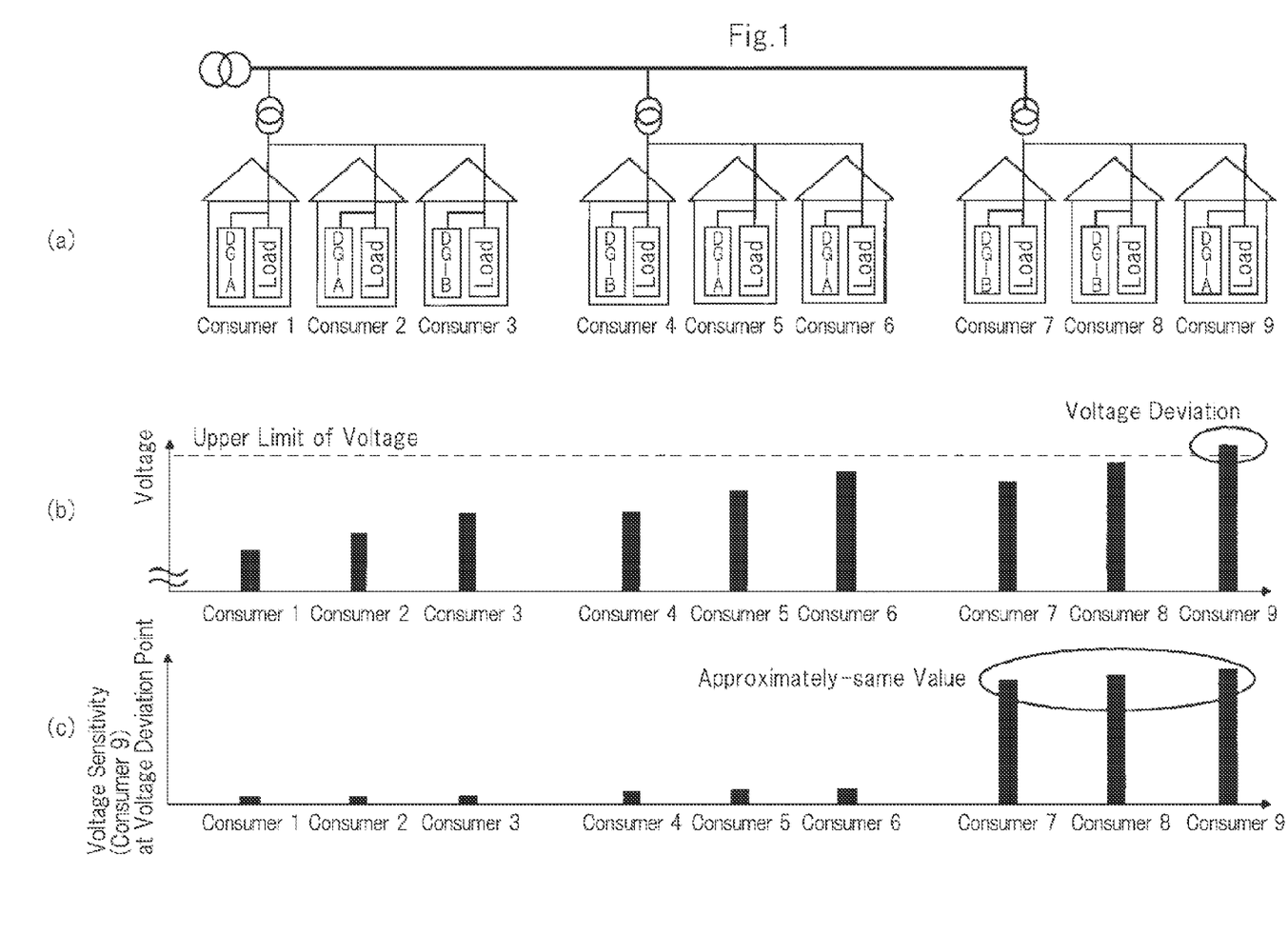
FIG. 1 is a schematic view for describing the principles of the electric power grid control system of the present invention.

FIG. 1 is a schematic view for explaining the principles of the electric power grid control system of the present invention.

FIG. 1(a) shows an example of the configuration of an electric power grid in which three pole transformers are connected to a high-voltage distribution line and the residences of three consumers equipped with distributed generators are each connected by way of a low-voltage distribution line to a respective pole transformer. DG-A and DG-B, with which consumers are equipped, respectively indicate: distributed generators that include PV and PCS that have a reactive power control (Q control) capability, and distributed generators that include PV and PCS that lack Q control capability. In addition, the load of each consumer indicates typical electrical equipment that consumes electric power.

In the electric power grid shown in FIG. 1(a), the amount of power generated by each DG is assumed to increase and the distribution line voltage at the connection point to the electric power grid of each of the consumers (consumers 1-9) is assumed to change as shown in FIG. 1(b). At this time, when each DG follows the guidelines of the above-described Non-Patent Document 1, the DG measures the distribution line voltage of the connection point of its own device, and upon detecting voltage deviation, autonomously suppresses a voltage increase by means of the above-described Q control or P control. In this case, the problem arises that voltage suppression control is concentrated at the DG of a consumer that is connected at a specific position (consumer 9 in the example shown in FIG. 1(b)) as described hereinabove.

In addition, when the DG of all consumers (consumers 1-9) are instructed to supply reactive power as proposed in Non-Patent Document 2, the inequality arises in which only DG-A that have Q control capability carry out voltage suppression control and DG-B that lacks Q control capability (for which there is less equipment investment) does not carry out voltage suppression control. For example, when voltage deviation occurs at the connection point of consumer 3, DG-A of neighboring consumers 1 and 2 carry out voltage suppression control but DG-B of consumer 3 does not carry out voltage suppression control.

Further, as described hereinabove, even if the voltage adjustment amount to suppress a voltage increase by DG is the same, the amount of voltage change at any connection point within the electric power grid varies according to the connection location of the DG, and the equal allocation of Q control to even the PCS of consumers that are connected to positions for which the voltage suppression effect is limited results in an increase in the total voltage adjustment amount and is therefore not efficient. The degree to which the voltage adjustment amount at any connection point within the electric power grid contributes to voltage change of other connection points is hereinbelow referred to as "voltage sensitivity."

For example, as shown in FIG. 1(c), the voltage sensitivity of consumers 1-6 for voltage at the connection point of consumer 9 that is the voltage deviation point is extremely small compared to the voltage sensitivity of consumers 7, 8, and 9. As a result, having the DG of consumers 1-6 execute voltage suppression control is not efficient. This is because the impedance of a pole transformer is greater than the impedance of a distribution line and it is thought that the voltage change at the connection point of each consumer to the electric power grid mainly occurs at the pole transformer.

In the present invention, a plurality of neighboring consumers forms a group, and when voltage deviation occurs in any group, the voltage adjustment amount is equally allocated for suppressing the increase in voltage to all DG in a group that includes DG that lack Q control capability, and each DG is caused to execute voltage suppression control. At this time, DG that have Q control capability in the present exemplary embodiment are caused to execute Q control that corresponds to the voltage adjustment amount that was allocated and DG that lack Q control capability are caused to execute P control that suppresses an amount of generated power that corresponds to the voltage adjustment amount that was allocated. Alternatively, consumers having DG that lack Q control capability are caused to operate a controllable load with which the consumer is provided corresponding to the voltage adjustment amount that was allocated, and any great increase in the amount of power consumption contributes to suppressing a voltage increase. In the following explanation, unless specifically stated, voltage suppression realized by P control is assumed to include only great increase in the amount of power consumption realized by operating a controllable load. Each consumer determines the amount of control realized by P control or Q control by multiplying the voltage adjustment amount that was allocated by a conversion coefficient that is common within a group.

By uniformly allocating a voltage adjustment amount to suppress a voltage increase to each DG in a group in this way, each neighboring consumer executes voltage suppression control equally. In addition, both DG having only P control capability and DG having Q control capability can be made to execute voltage suppression control.

In the present exemplary embodiment, groups are made up by consumers that are connected to the same pole transformer. For example, when the P control amount of consumer A is $dP_A$, the Q control amount of consumer A is $dQ_A$, and the amount of voltage change at the connection point of consumer B is $dV_B$, the values $dV_B/dP_A$ and $dV_B/dQ_A$ when consumers A and B are connected to the same pole transformer are far greater than the values $dV_B/dP_A$ and $dV_B/dQ_A$ when consumers A and B are connected to different pole transformers. As a result, if the voltage adjustment amount for suppressing voltage increase is uniformly allocated to each DG of a group made up from consumers that are connected to the same pole transformer, the total voltage adjustment amount can be made far less than when a voltage adjustment amount is equally allocated to each DG of groups made up by consumers that are connected to different pole transformers.

In a group made up of a plurality of consumers that are connected to the same pole transformer, $dV_B/dP_A$ and $dV_B/dQ_A$ are substantially the same values regardless of how the above-described consumers A and B are selected. As a result, if $dV_B/dP_A$ is equal to $dV/dP$, $dV_B/dQ_A$ is equal to $dV/dQ$, and the Q control amount is made a multiple of $(dV/dP)/(dV/dQ)$ of the P control amount, a substantially equal voltage suppression effect can be obtained by P control and Q control and equality can thus be maintained between consumers that carry out P control and consumers that carry out Q control.

For example, in the electric power grid shown in FIG. 1, a group is formed by consumers 1, 2, and 3, a group is formed by consumers 4, 5, and 6, and a group is formed by consumers 7, 8, and 9. When voltage deviation occurs at the connection point of consumer 9 in this case, the voltage adjustment amount is equally allocated to consumers 7, 8, and 9, and each of consumers 7, 8, and 9 should then implement voltage suppression control by using the shared conversion coefficient within the group to convert the allocated voltage adjustment amount to the P control amount or Q control amount according to its own equipment.

In this case, DG-A that have Q control capability implement Q control, and consumers that have DG-B that lack Q control capability can, if they have a controllable load having an energy-storage capability such as an electric vehicle (EV) or heat-pump water heater (HP), suppress voltage increase without decreasing the amount of generated power by causing the electric power to be consumed by this load.

As shown in FIG. 1(c), voltage sensitivity with respect to the voltage deviation point is substantially the same for each consumer that is connected to the same pole transformer, and the voltage sensitivity for each consumer that is connected to the same pole transformer as the voltage deviation point is a value greater than for each consumer that is connected to a pole transformer that differs from the voltage deviation point.

As a result, equally allocating a voltage adjustment amount to suppress a voltage increase to each consumer that is connected to the same pole transformer as the voltage deviation point enables efficient avoidance of voltage deviation while cancelling inequality among neighboring consumers that are connected to the same pole transformer.

The configuration of the electric power grid control system of the present exemplary embodiment is next described using the accompanying drawings.

Figure 2:
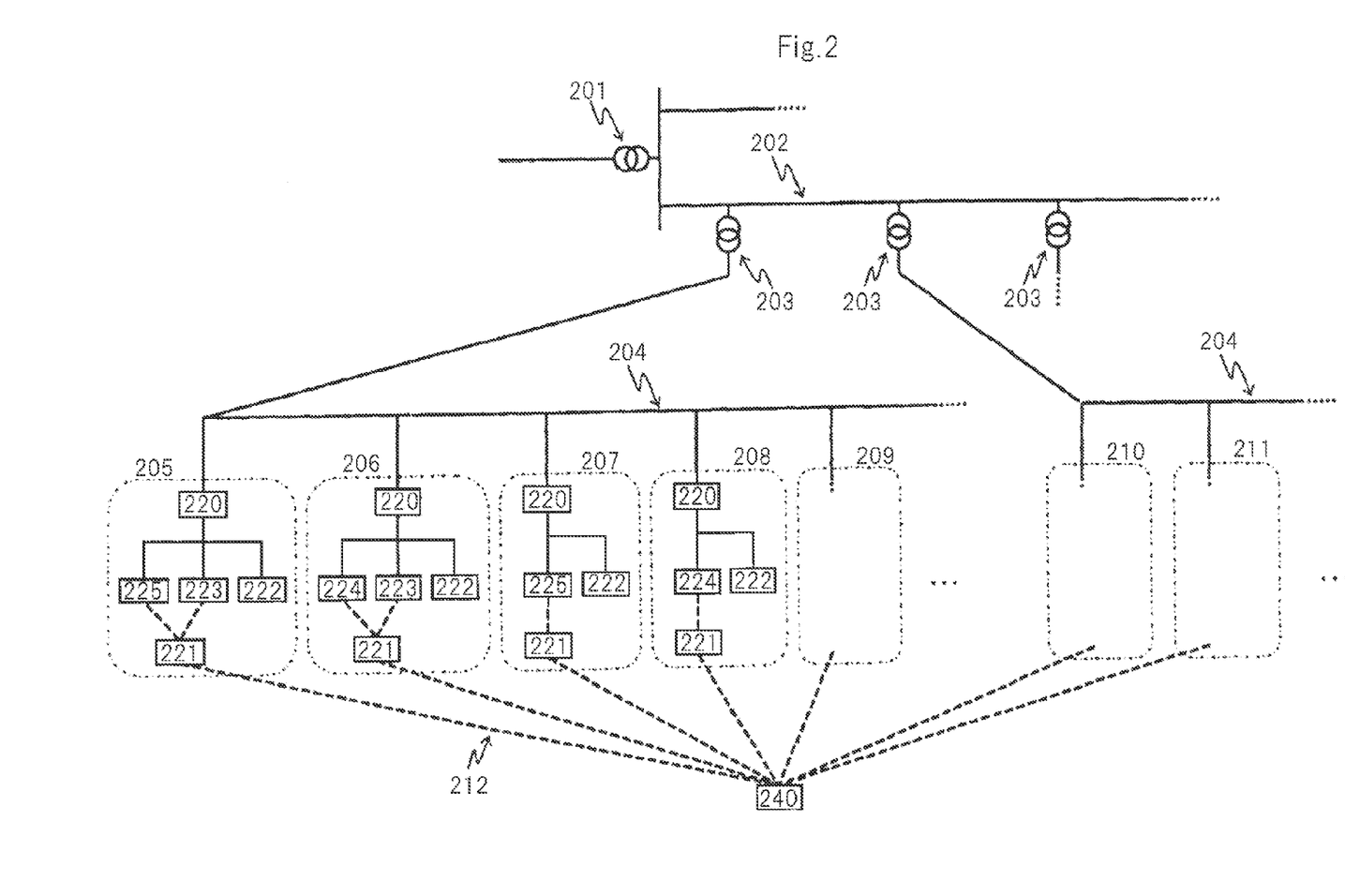
FIG. 2 is a block diagram showing an example of the configuration of the electric power grid control system of the present invention.

FIG. 2 is a block diagram showing an example of the configuration of the electric power grid control system of the present invention.

As shown in FIG. 2, the electric power grid control system of the present exemplary embodiment is of a configuration in which a plurality of pole transformers 203 are connected by way of high-voltage distribution line 202 to distribution transformer 201, and a plurality of consumers (consumers 205-211 in FIG. 2) provided with distributed generators are connected by way of low-voltage distribution lines 204 to each pole transformer 203.

Consumers 205-211 are provided with: PV systems 224 or 225 that are distributed generators; distribution processing devices 221 that are able to use communication means 212 to transmit information to and receive information from the outside and that control the operation of PV system 224 or 225; typical load 222 that are typical electrical appliances that consume electric power; and measurement instruments 220 that measure the electric power (amount of sold power) that is generated at PV system 224 or 225 and that is reverse power flow to the electric power grid. In some cases, consumers (in the example shown in FIG. 2, consumer 205 and 206) are equipped with controllable load 223 whose amount of power consumption can be controlled. In the electric power grid control system shown in FIG. 2, consumers that are not provided with PV systems 224 or 225 (having only typical load 222) have been omitted.

PV systems 224 and 225 are provided with voltage measurement units, PV panels and PCS (not shown). The voltage measurement units measure the distribution line voltage at the connection points of PV systems 224 or 225. The distribution line voltage that is measured by a voltage measurement unit is reported to centralized control device 240 by way of distribution processing device 221. A PV panel is power generation equipment that generates electric power by energy obtained from sunlight. A PCS converts the electric power that is generated by a PV panel to voltage and frequency that can be linked to the electric power grid. PV systems 224 and 225 are provided with a function for controlling reactive power or active power in accordance with instructions from centralized control device 240. PV systems 225 shown in FIG. 2 are systems having a reactive power control (Q control) capability, and PV systems 224 are systems that lack Q control capability.

Distribution processing devices 221 are connected with centralized control device 240 by way of communication means 212 so as to allow the transmission and reception of information. Communication means 212 may employ a known wireless communication means such as the Internet or PLC (Power Line Communications). Distribution processing devices 221 both cause PV systems 224 and 225 to execute Q control or P control in accordance with instructions from centralized control device 240 and report the distribution line voltage at connection points that was measured by voltage measurement units and the electric power of reverse power flow to the electric power grid that was measured by measurement instruments 220 by way of communication means 212 to centralized control device 240.

Centralized control device 240 transmits information to and receives information from each distribution processing device 221 by way of communication means 212, and further, controls the operations of PV systems 224 and 225 as well as controllable loads 223 by way of distribution processing devices 221. Distribution processing devices 221 and centralized control device 240 can be realized by information processing devices (computer) that are provided with, for example, a CPU, a storage device, and a known interface for communication.

Controllable load 223 is electrical equipment in which the amount of electric power consumption can be controlled, and the amount of electric power consumption of controllable load 223 is instructed from centralized control device 240 by way of distribution processing devices 221. Controllable load 223 is preferably an energy storage device such as an EV, HP, or storage battery in which the time of importing electric power from the electric power grid or PV system 224 and the time of actually using the imported electric power can be individually set.

FIG. 2 shows an example of a configuration in which an electric power grid control system is provided with distribution processing devices 221 and centralized control device 240 that are independent of each other, but the functions of centralized control device 240 may be provided in any distribution processing device 221. In addition, FIG. 2 shows an example of a configuration in which voltage measurement units are incorporated in PV systems 224 and 225, but voltage measurement units may be devices that are independent of PV systems 224 and 225.

The electric power grid control method of the present exemplary embodiment is next described using the accompanying drawings.

In the electric power grid control method of the present exemplary embodiment, when voltage deviation occurs in low-voltage distribution line 204 that is connected to any pole transformer 203, voltage suppression control is instructed from centralized control device 240 by way of distribution processing devices 221 to each of PV systems 224 and 225 of a group made up of consumers that are connected to low-voltage distribution line 204.

Figure 3:
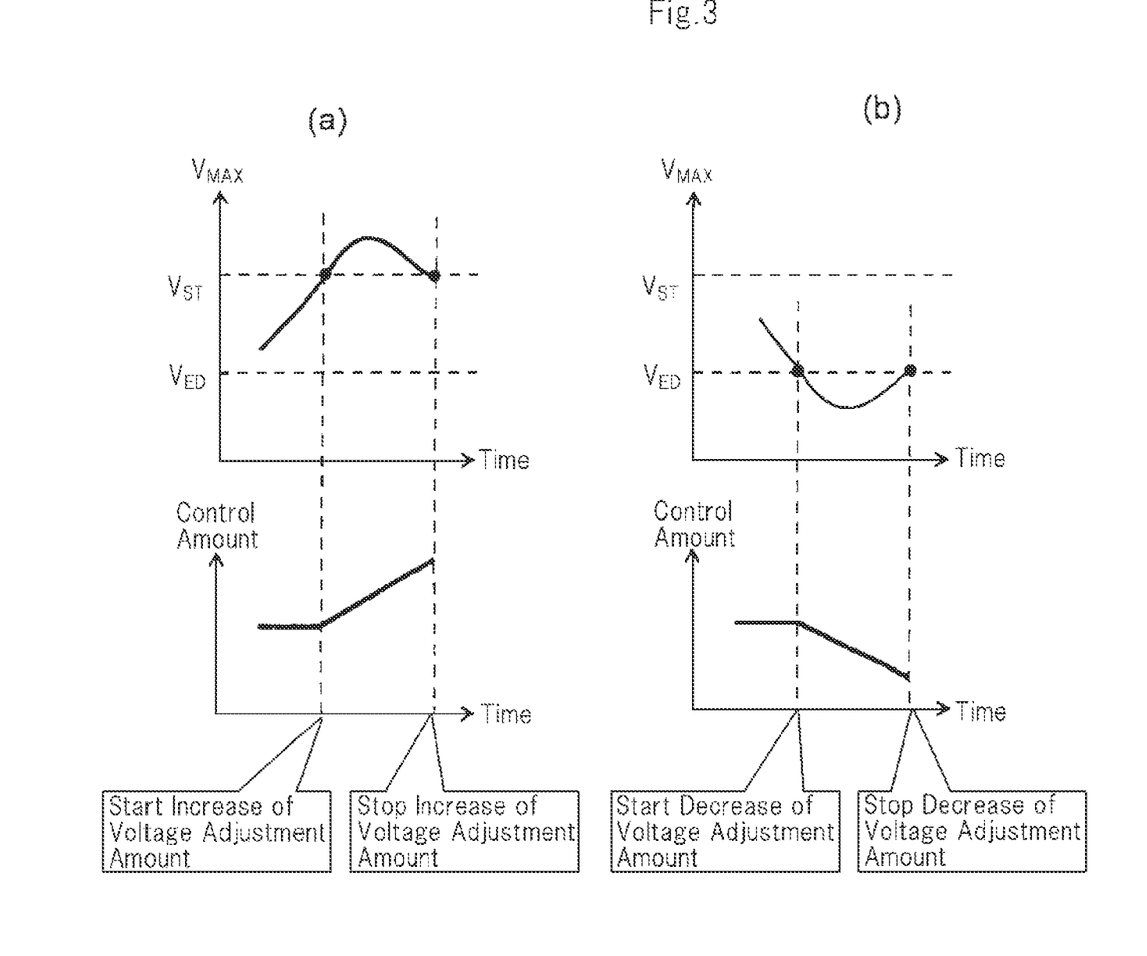
FIG. 3 is a schematic view that shows how the highest distribution line voltage changes within a group when the electric power grid control method of the present exemplary embodiment is applied.

FIG. 3 is a schematic view showing how the highest distribution line voltage within a group changes when the electric power grid control method of the present exemplary embodiment is applied.

As shown in FIG. 3, in the electric power grid control method of the present exemplary embodiment, the maximum value (107 V in Japan) of the acceptable value of the distribution line voltage or a value that is slightly lower than the maximum value (for example, by 0.1 V) is taken as the first threshold value $V_{ST}$, and a value that is lower than the first threshold value $V_{ST}$ (for example, $V_{ST}$–0.3 V) is taken as the second threshold value $V_{ED}$.

Taking $V_{MAX}$ as the highest distribution line voltage within a group, when $V_{MAX}$ increases due to, for example, a large increase in the amount of generated power of each distributed generator and $V_{MAX}$ exceeds the first threshold value $V_{ST}$, centralized control device 240 instructs all distribution processing devices 221 within the group to increase the voltage adjustment amount that is needed to suppress a voltage increase as shown in FIG. 3(a). When $V_{MAX}$ subsequently falls due to the increase of the voltage adjustment amount to suppress a voltage increase and reaches the first threshold value $V_{ST}$, centralized control device 240 instructs all distribution processing devices 221 within the group to fix the voltage adjustment amount to suppress a voltage increase.

When, for example, the amount of generated power of distributed generators decreases and $V_{MAX}$ reaches second threshold value $V_{ED}$, centralized control device 240 instructs all distribution processing devices 221 within the group to decrease the voltage adjustment amount to suppress a voltage increase, as shown in FIG. 3(b). When the voltage adjustment amount subsequently becomes "0" or $V_{MAX}$ rises and reaches the second threshold value $V_{ED}$, centralized control device 240 instructs all distribution processing devices 221 within the group to fix the voltage adjustment amount to suppress a voltage increase.

Figure 4:
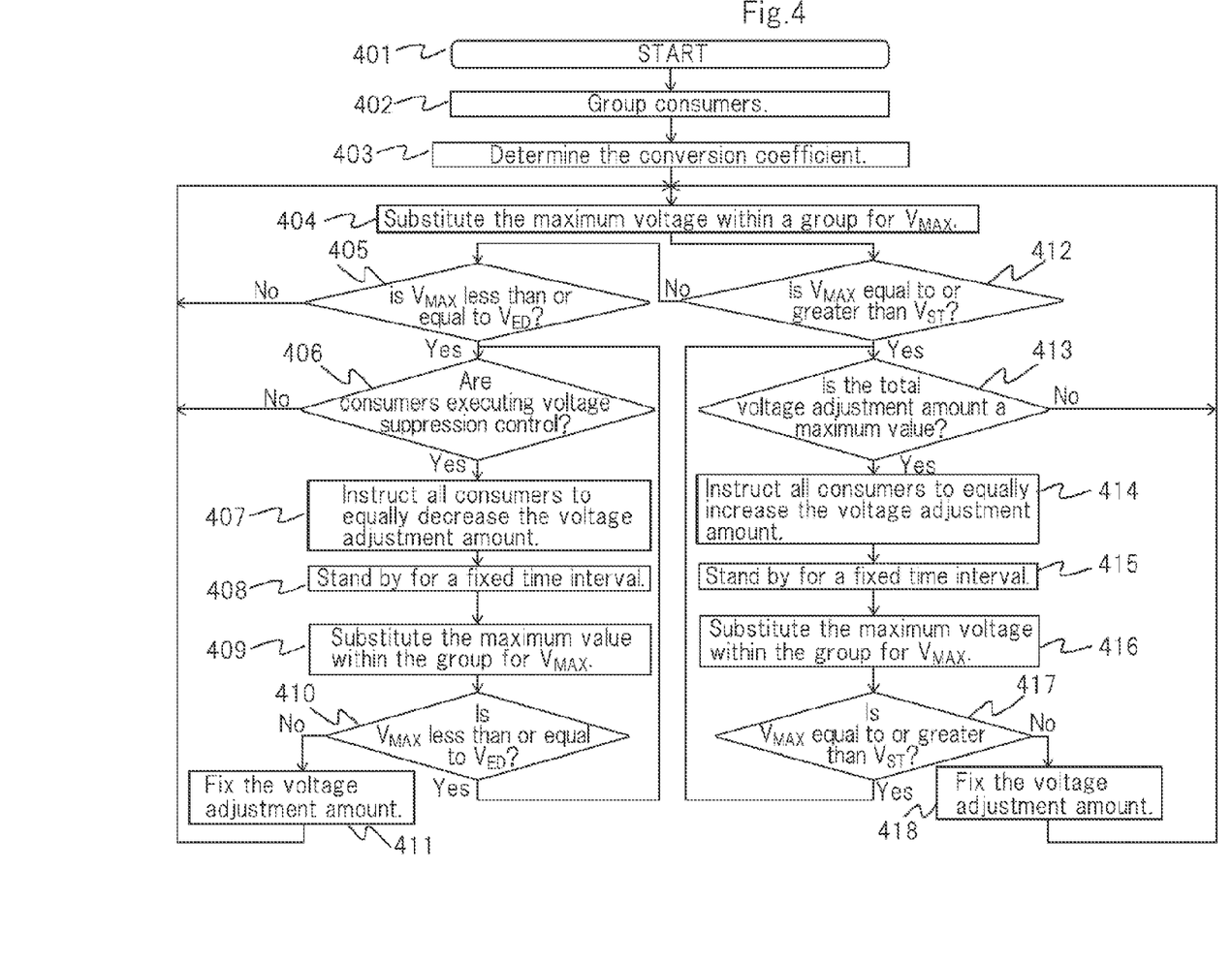
FIG. 4 is a flow chart showing the processing procedure of the centralized control device shown in FIG. 2.

FIG. 4 is a flow chart showing the processing procedure of the centralized control device shown in FIG. 2.

As shown in FIG. 4, centralized control device 240 first groups each of the consumers in Step 402. As described hereinabove, in the present exemplary embodiment, a group is formed of consumers that are connected to the same pole transformer 203.

The method of grouping consumers for each pole transformer 203 may be a method of forming groups based on a distribution map of the electric power grid acquired from a power company, a method of forming groups based on the distribution line voltage, or a method of forming groups based on voltage sensitivity.

When groups are formed based on the distribution line voltage, centralized control device 240 acquires the distribution line voltage of each connection point that is measured by means of the voltage measurement units provided in each of PV systems 224 and 225 and consumers for which the value of the distribution line voltage is near are assigned to the same group.

When groups are formed based on voltage sensitivity, centralized control device 240 assigns consumers for whom the values of voltage sensitivity are near to the same group. The voltage sensitivity can be found from the correlation value of the amount of reverse power flow that flows back to the electric power grid from the connection point of each consumer and the amount of change of the distribution line voltage at the connection point of each consumer. The amount of reverse power flow that is caused to flow back to the electric power grid from consumers is measured by measurement instruments 220 as described hereinabove and should be reported to centralized control device 240 by distribution processing devices 221. The amount of change in the distribution line voltage is obtained by recording the distribution line voltage of the connection point that was measured by voltage measurement units that are provided in PV systems 224 and 225 and then finding the time derivative.

Centralized control device 240 next finds the conversion coefficient that is used in the calculation of the P control amount or Q control amount corresponding to the voltage adjustment amount to suppress a voltage increase that is instructed to each distribution processing device 221 in Step 403 and reports the conversion coefficient that was found to each distribution processing device 221. The conversion coefficient is set such that the ratio of the amount of P control to the amount of Q control is $1/(dV/dP):1/(dV/dQ)$. Here, V is the distribution line voltage at the connection point of any consumer within a group, P is the amount of active power, and Q is the amount of reactive power.

As described hereinabove, the amount of change of distribution line voltage at the connection point of each consumer that is realized by P control and Q control of each of PV systems 224 and 225 that are connected to the same pole transformer 203 is the same, and a common value can therefore be used for the above-described dV/dP and dV/dQ within a group. The values of dV/dP and dV/dQ can be found by acquiring the amount of reverse power that is caused to flow back to the electric power grid from consumers and the amount of change in the distribution line voltage at the connection point for each consumer and then using the correlation value of these values. In addition, dV/dP may employ an approximate value obtained by dividing the real part of the impedance of pole transformer 203 by a representative value (for example, 100V) of the secondary-side voltage of pole transformer 203, and dV/dQ may employ an approximate value obtained by dividing the imaginary part of the impedance of pole transformer 203 by a representative value (for example, 100V) of the secondary-side voltage of pole transformer 203. A conversion coefficient that presents no practical problem can be obtained when these approximate values are used for dV/dP and dV/dQ.

Centralized control device 240 next obtains the value of the distribution line voltage from distribution processing device 221 of each consumer and substitutes the value of the maximum distribution line voltage within the group for the variable $V_{MAX}$ (Step 404).

Centralized control device 240 next judges whether variable $V_{MAX}$ is higher than the first threshold value $V_{ST}$ in Step 412. When variable $V_{MAX}$ is higher than the first threshold value $V_{ST}$, centralized control device 240 transitions to the processes of Steps 413-418.

When variable $V_{MAX}$ is lower than the first threshold value $V_{ST}$, centralized control device 240 judges whether variable $V_{MAX}$ is lower than the second threshold value $V_{ED}$ in Step 405. When variable $V_{MAX}$ is lower than the second threshold value $V_{ED}$, centralized control device 240 transitions to the processes of Steps 406-411.

The processing of centralized control device 240 when variable $V_{MAX}$ is judged to be higher than the first threshold value $V_{ST}$ in Step 412 is next described.

When variable $V_{MAX}$ is higher than the first threshold value $V_{ST}$, centralized control device 240 judges whether the total voltage adjustment amount to suppress a voltage increase by all of the consumers within the corresponding group has reached a predetermined maximum value in Step 413.

In the present exemplary embodiment, a maximum value is set in advance for the total voltage adjustment amount to suppress a voltage increase that centralized control device 240 can control, and when voltage deviation is not cancelled despite having reached this maximum value, the process transitions to autonomous voltage suppression control that is realized by each of the above-described PV systems 224 and 225.

A method exists for setting, as the maximum value of the voltage adjustment amount realized by all PV systems 224 and 225 that can be controlled by centralized control device 240, a value in the output value of the reactive power realized by all PV systems 224 and 225 within a group such that the minimum value that is stipulated in Non-Patent Document 2, more specifically, the power factor, is 85%.

When the total voltage adjustment amount to suppress a voltage increase realized by consumers within a group reaches the predetermined maximum value, voltage increase is suppressed by an autonomous voltage suppression capability (prescribed by Non-Patent Document 1) provided in PV systems 224 and 225 without implementing voltage suppression control realized by centralized control device 240. In this case, centralized control device 240 repeats the process from Step 404.

When the total voltage adjustment amount to suppress a voltage increase by consumers within a group does not reach the predetermined maximum value, centralized control device 240 instructs all consumers within a group to increase the voltage adjustment amount equally in Step 414. At this time, the voltage adjustment amount instructed to each consumer includes the active power amount, the reactive power amount, the voltage value, and the time derivative value of the active power amount, the reactive power amount, and the voltage amount.

When the time derivative value is used as the voltage adjustment amount that is instructed to each consumer, centralized control device 240 records the voltage change in the maximum distribution line voltage $V_{MAX}$ within the group and instructs to each consumer the time derivative value of the active power amount, the reactive power amount, or the voltage value such that $dV_{MAX}/dT$ obtained from the recorded value is cancelled out.

For example, when the active power amount is used as the voltage adjustment amount that is instructed to each consumer, centralized control device 240 uniformly distributes the active power amount to each consumer such that the total voltage adjustment amount (the sum total of voltage adjustment amounts that are allocated to all consumers within the group) is $(V_{MAX}-V_{ST})/(dV/dP)$.

When the time derivative value of the active power amount is used, centralized control device 240 uniformly distributes the time derivative value of the active power amount to each consumer such that the total voltage adjustment amount is $(dV_{MAX}/dT) \times (dV/dP)$.

In either case, the conversion coefficient that is found in Step 403 is $(dV/dP)/(dV/dQ)$, and consumers that carry out reactive power control should change the reactive power value in the direction in which voltage increase is suppressed by a value obtained by multiplying $(dV/dP)/(dV/dQ)$ by the instructed active power amount.

When the reactive power amount is used as the voltage adjustment amount that is instructed to each consumer, centralized control device 240 may uniformly distribute the reactive power amount to each consumer such that the total voltage adjustment amount is $(V_{MAX}-V_{ST})/(dV/dQ)$.

When the time derivative value of the reactive power amount is used, centralized control device 240 may uniformly distribute the time derivative value of the reactive power amount to each consumer such that the total voltage adjustment amount is $(dV_{MAX}/dT) \times (dV/dQ)$.

In either case, the conversion coefficient that is found in Step 403 is $(dV/dQ)/(dV/dP)$, and the consumers that carry out active power control may change the active power value in the direction that suppresses voltage increase by a value obtained by multiplying $(dV/dQ)/(dV/dP)$ by the instructed reactive power amount.

When the voltage value is used as the voltage adjustment amount that is instructed to each consumer, centralized control device 240 may uniformly distribute to each consumer a voltage value such that the total voltage adjustment amount is $(V_{MAX}-V_{ST})$.

When the time derivative value of the voltage value is used, centralized control device 240 may uniformly distribute to each consumer the time derivative value of the voltage value such that the total voltage adjustment amount is $(dV_{MAX}/dT)$.

In either case, the conversion coefficient that is found in Step 403 is $(dV/dP)$ or $(dV/dQ)$, and consumers that carry out active power control may change the active power value in the direction of suppressing a voltage increase by a value obtained by dividing the instructed voltage value by dV/dP. Alternatively, consumers that carry out reactive power control may change the reactive power value in the direction of suppressing voltage a increase by a value obtained by dividing the instructed voltage value by dV/dQ.

The voltage adjustment amount that is here allocated to each consumer may use a uniform value obtained by dividing the total voltage adjustment amount by the number of consumers as described hereinabove, or may use a value obtained by adding a predetermined weighting for each consumer to the uniform value within a range in which the total voltage adjustment amount does not change. For example, a weighting that is proportional to the capacity of the power generation equipment provided in each consumer, a weighting that is proportional to the amount of reverse power flow of each consumer, or a weighting that is proportional to the amount of power sold back within a fixed past interval (for example, one month) may be added to the uniform value.

After the passage of a fixed interval of standby in Step 415, centralized control device 240 judges whether the voltage deviation has continued in Steps 416 and 417. If the voltage deviation continues, centralized control device 240 returns to Step 413 and repeats the processes of Steps 413 to 417. If the voltage deviation has been canceled, centralized control device 240 instructs PV systems 224 and 225 of each consumer to keep constant the voltage adjustment amount for suppressing voltage increase in Step 418, and then repeats the processes from Step 404.

The processing of centralized control device 240 when variable $V_{MAX}$ is judged to be lower than the second threshold value $V_{ED}$ in Steps 412 and 405 is next described.

For example, when variable $V_{MAX}$ falls below the second threshold value $V_{ED}$ due to a decrease in the amount of generated power of PV systems 224 and 225, centralized control device 240 first judges in Step 406 whether the PV systems 224 and 225 of each consumer are executing voltage suppression control or not, i.e., whether or not a further decrease of the voltage adjustment amount to suppress a voltage increase is possible. If PV systems 224 and 225 of each consumer are not executing voltage suppression control, centralized control device 240 repeats the processes from Step 404.

If PV systems 224 and 225 of each consumer are executing voltage suppression control, centralized control device 240 in Step 407 instructs PV systems 224 and 225 of each consumer within the group to uniformly decrease the voltage adjustment amount. In Step 407, a process that is the reverse of the above-described Step 414 should be executed. More specifically, $(V_{MAX}-V_{ST})$ that is used in the calculation of the total voltage adjustment amount should be replaced by $(V_{MAX}-V_{ED})$ and the process of changing the active power value or reactive power value in the direction of suppressing voltage increase should be replaced by a process of changing the active power value or reactive power value in the direction that does not suppress voltage increase.

After standby of a fixed interval in Step 408, centralized control device 240 repeats the processes of Steps 406-409 until variable $V_{MAX}$ exceeds the second threshold value $V_{ED}$ in Steps 409 and 410. When variable $V_{MAX}$ exceeds the second threshold value $V_{ED}$, centralized control device 240 in Step 411 instructs PV systems 224 and 225 of each consumer to keep the voltage adjustment amount for suppressing voltage increase at a constant and then repeats the processes from Step 404.

When the total voltage adjustment amount to suppress a voltage increase by all consumers within a group reaches the predetermined maximum value in the above-described Step 413, centralized control device 240 may request that PV systems 224 and 225 of consumers that are connected to other pole transformers 203 carry out voltage suppression control.

In order to decrease inequality among neighboring consumers in this case, there are methods, for example, for requesting voltage suppression control to groups that are connected to pole transformers 203 that is downstream from neighbor pole transformer 203 in which voltage deviation occurred.

Alternatively, there is a method for, when the side of the distribution substation is upstream and the side of termination of low-voltage distribution line 204 is downstream, as seen from pole transformer 203 in which the voltage deviation occurred, requesting voltage suppression control to the group that is connected to pole transformer 203 that is downstream from pole transformer 203 in which the voltage deviation occurred.

When the distribution line voltage to which any consumer is linked is to be decreased, implementing voltage suppression control by each consumer that is connected to the same pole transformer 203 as described hereinabove involves the lowest total voltage adjustment amount, and carrying out voltage suppression control by each consumer that is connected to pole transformer 203 that is further downstream involves the next lowest total voltage adjustment amount after implementing voltage suppression control by each consumer that is connected to same pole transformer 203. This is because the necessary voltage adjustment amount is fixed if it is further downstream than pole transformer 203 in which voltage deviation occurred regardless of the connection location of pole transformer 203. Conversely, when voltage suppression control is carried out by each consumer connected to pole transformer 203 that is further upstream than pole transformer 203 in which voltage deviation occurred, the voltage adjustment amount to suppress a voltage increase increases, and greater voltage adjustment amounts are required with further progress upstream.

Accordingly, when voltage deviation occurs in any group, and moreover, when voltage suppression control by centralized control device 240 becomes impossible in that group, requesting voltage suppression control to a group that is connected to pole transformer 203 that is downstream from the group, as seen from the distribution substation, enables avoidance of the voltage deviation while suppressing an increase in the total voltage adjustment amount. In addition, requesting voltage suppression control to a group that is adjacent to the group in which voltage deviation occurred at this time enables a decrease in inequality among neighboring consumers. Still further, requesting voltage suppression control to the group that is furthest downstream, as seen from the distribution substation, enables avoidance of voltage deviation while suppressing an increase in the voltage adjustment amount regardless of the group in which the voltage deviation occurred, because this group is downstream, as from all groups that are linked to same high-voltage distribution line 202, and moreover, enables avoidance of voltage deviation even when voltage suppression control by centralized control device 240 of that group becomes impossible.

When voltage deviation occurs in any group, and moreover, when voltage suppression control by centralized control device 240 of that group becomes impossible, there is a method for requesting voltage suppression control to the group in which there is a high possibility that the next voltage deviation will occur. More specifically, voltage suppression control should be requested to the group that includes the consumer having the next highest maximum voltage after the group in which the voltage deviation occurred, or to the group that includes the consumer for whom the amount of change (dV/dT) of distribution line voltage V is highest after the group in which the voltage deviation occurred.

The processing procedure of distribution processing devices 221 provided in each consumer is next described.

Distribution processing device 221 acquires from centralized control device 240 the conversion coefficient that corresponds to its own group that was found by centralized control device 240 in Step 403 of FIG. 4.

When distribution processing device 221 is instructed to increase the voltage adjustment amount by centralized control device 240 in Step 414 of FIG. 4, distribution processing device 221 increases the voltage adjustment amount in the order of: reactive power control (Q control) realized by PCS provided in PV systems 224 and 225, active power control (P control) realized by controllable load 223, and active power control (P control) realized by the amount of generated power of PV systems 224 and 225 to suppress the voltage increase. When requested to decrease the voltage adjustment amount from centralized control device 240 in Step 407 of FIG. 4, distribution processing device 221 decreases the voltage adjustment amount in the order of: active power control (P control) realized by the amount of generated power of PV systems 224 and 225, active power control (P control) realized by controllable load 223, and reactive power control (Q control).

Figure 5:
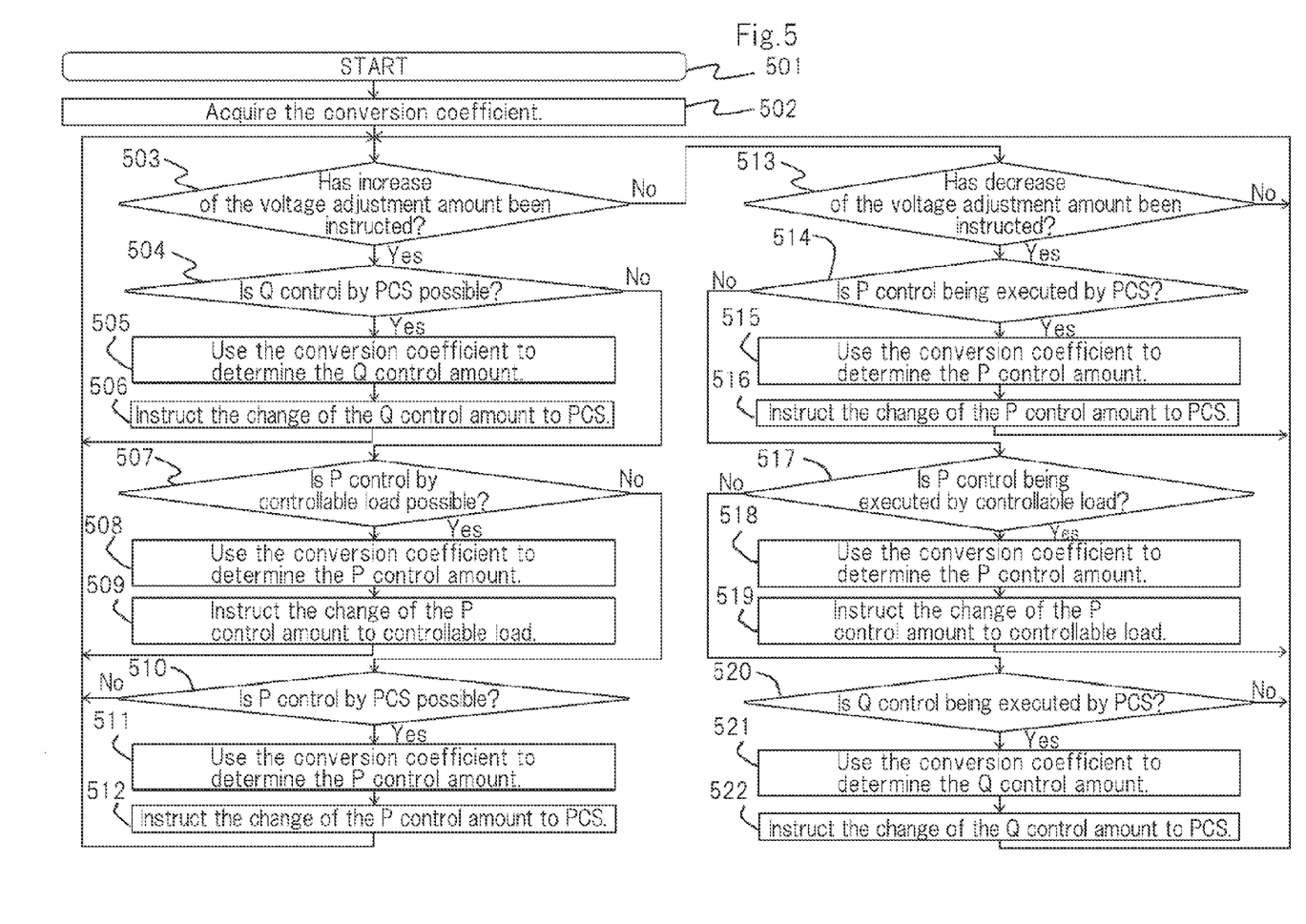
FIG. 5 is a flow chart showing the processing procedure of the distribution processing device shown in FIG. 2.

FIG. 5 is a flow chart showing the processing procedure of the distribution processing devices shown in FIG. 2.

First, in Step 502, distribution processing device 221 acquires the conversion coefficient, that was found in Step 403 in FIG. 4, from centralized control device 240.

Distribution processing device 221 next stands by until change of the voltage adjustment amount is instructed from centralized control device 240 (Steps 503 and 513), and then transitions to the process of Step 504 when an increase in the voltage adjustment amount is instructed and transitions to the process of Step 513 when a decrease in the voltage adjustment amount is instructed.

When as increase in the voltage adjustment amount is instructed, distribution processing device 221 first judges in Step 504 whether reactive power control (Q control) by PCS of PV systems 224 and 225 is possible. If Q control is possible, distribution processing device 221 uses the conversion coefficient to convert the voltage adjustment amount that was instructed from centralized control device 240 to a Q control amount (Step 505) and instructs the PCS of PV systems 224 and 225 to change (increase) to the Q control amount after the conversion (Step 506).

If PCS are not provided with Q control capability, or if the amount of output of reactive power has reached the maximum value that was set in advance, distribution processing device 221 transitions to Step 507 and carries out P control using controllable load 223.

Distribution processing device 221 first judges whether active power control (P control) is possible by increasing load used by controllable load 223 (Step 507). If P control using controllable load 223 is possible, distribution processing device 221 uses the conversion coefficient to convert the voltage adjustment amount that was instructed from centralized control device 240 to a P control amount (Step 508) and then instructs controllable load 223 to change (increase of load) to the P control amount that follows conversion (Step 509).

If a controllable load is not provided, or if controllable load 223 is already operating at the maximum load, distribution processing device 221 transitions to Step 510 and carries out P control by the amount of generated power of PV systems 224 and 225.

Distribution processing device 221 first judges in Step 510 whether P control by PCS of PV systems 224 and 225 is possible. If P control by PCS is possible, distribution processing device 221 next uses the conversion coefficient to convert the voltage adjustment amount that was instructed from centralized control device 240 to a P control amount (Step 511) and then instructs the PCS to change (decrease the amount of generated power) to the P control amount that follows the conversion (Step 512).

If PCS have already halted suppressing the amount of generated power, a further increase in the voltage adjustment amount to suppress a voltage increase is not possible. In this case, distribution processing device 221 repeats the processes from Step 503.

If a decrease in the voltage adjustment amount has been instructed from centralized control device 240 in Step 513, distribution processing device 221 executes the processes of Steps 514-522. The processes of Steps 514-522 may decrease the voltage adjustment amount in the order of: P control by PCS, P control by controllable load 223, and Q control by PCS, which is the reverse of the processes when an increase in the voltage adjustment amount is instructed from centralized control device 240 in Steps 504-512. The processing procedure of P control by PCS is the same as Steps 510-512 described hereinabove, the processing procedure of P control by controllable load 223 is the same as Steps 507-509 described hereinabove, and the processing procedure of Q control by PCS is the same as Steps 504-506 described hereinabove. However, in the processes of Steps 514, 517, and 520, distribution processing device 221 judges whether PCS or controllable load 223 is executing P control or Q control, i.e., whether a further decrease in the voltage adjustment amount is possible.

As described hereinabove, controllable load 223 preferably employs an energy storage device such as a battery or a heat-pump water heater. In an energy storage device, however, the rated capacity that is the maximum amount of energy that can be stored is set. As a result, a consumer is preferably equipped with a plurality of controllable loads 223. In this case, if the amount of energy that is being stored by means of P control to any of controllable loads 223 reaches the rated capacity of that controllable load 223, controllable load 223 that stores energy should be switched. Distribution processing device 221 allocates the voltage adjustment amount for controllable load 223 that was being used up to that point to controllable load 223 that follows switching and executes the processes from Step 504 of FIG. 5.

Although the invention of the present application has been described with reference to an exemplary embodiment, the invention of the present application is not limited to the above-described exemplary embodiment. The configuration and details of the invention of the present application are open to various modifications within the scope of the invention of the present application that will be clear to one of ordinary skill in the art.

This application is based upon and claims the benefit of priority from Japanese patent application No. 2010-249745, filed on Nov. 8, 2010, the disclosure of which is incorporated herein in its entirety by reference.

The invention claimed is:

1. An electric power grid control system comprising:
   distributed generators that are connected to an electric power grid;
   voltage measurement units that measure voltage of connection points of said distributed generators to said electric power grid;
   a centralized control device that, when voltage at a said connection point deviates from a predetermined acceptable range, allocates a voltage adjustment amount for returning the voltage to said acceptable range to all said distributed generators within a predetermined group that has been set in advance; and
   distribution processing devices that cause said distributed generators to adjust voltage at said connection points in accordance with said voltage adjustment amount that was allocated from said centralized control device, wherein said group is formed of consumers that are connected to a single pole transformer and provided with said distributed generators, said voltage measurement units, and said distribution processing devices, said distribution processing devices adjust voltage at said connection points by means of active power or reactive power that is caused to flow back to said electric power grid from said distributed generators, and said distribution processing devices make the ratio between the voltage adjustment amount by said reactive power and the voltage adjustment amount by said active power $1/(dV/dP):1/(dV/dQ)$, where V is the voltage at said connection points, P is said active power amount, and Q is said reactive power amount.

2. The electric power grid control system according to claim 1, further comprising controllable load in which the amount of electric power consumption can be controlled; wherein:

said distribution processing devices adjust voltage at said connection points by advanced-phase reactive power that is caused to flow back to said electric power grid from said distributed generators, the amount being the amount of power generated by said distributed generators, or the amount of electric power consumed by said controllable load.

3. The electric power grid control system according to claim 1, wherein said group is formed of consumers based on distribution line voltages measured by said voltage measurement units provided with each of said distributed generators.

4. The electric power grid control system according to claim 3, wherein said group is formed of consumers based on voltage sensitivities that are detected in the amounts of change in each of distribution line voltages measured by said voltage measurement units provided with each of said distributed generators and the amounts of reverse power flow that are caused to flow back to the electric power grid from each of said distributed generators.

5. The electric power grid control system according to claim 1, wherein when the total voltage adjustment amount of said distributed generators reaches a predetermined maximum value, said centralized control device requests voltage suppression control to a group that is connected to a pole transformer that is downstream from a pole transformer in which the voltage deviation occurred.

6. An electric power grid control method of an electric power grid control system that is equipped with distributed generators that are connected to an electric power grid and voltage measurement units that measure voltage of connection points of said distributed generators to said electric power grid, said control method comprising steps of:

when voltage at a said connection point deviates from a predetermined acceptable range, allocating a voltage adjustment amount for returning the voltage to said acceptable range to all of said distributed generators that belong to a predetermined group that is set in advance; and causing said distributed generators to adjust voltage at said connection points in accordance with said voltage adjustment amount that was allocated, wherein said group is formed of consumers that are connected to a single pole transformer and provided with said distributed generators, said voltage measurement units, and said distribution processing devices, voltage at said connection points is adjusted by means of reactive power that is caused to flow back to said electric power grid from said distributed generators or active power, and the ratio of the voltage adjustment amount realized by said reactive power to the voltage adjustment amount realized by said active power is $1/(dV/dP):1/(dV/dQ)$, where V is the voltage at said connection points, P is said active power amount, and Q is said reactive power amount.

7. The electric power grid control method according to claim 6, wherein:

controllable load in which the amount of electric power consumption can be controlled is equipped in said electric power grid control system; and voltage at said connection points is adjusted by advanced-phase reactive power that is caused to flow back to said electric power grid from said distributed generators, the amount being the amount of power generated by said distributed generators, or the amount of electric power consumed by said controllable load.

8. The electric power grid control system according to claim 6, wherein said group is formed of consumers based on distribution line voltages measured by said voltage measurement units provided with each of said distributed generators.

9. The electric power grid control system according to claim 8, wherein, said group is formed of consumers based on voltage sensitivities that are detected in the amounts of change in each of distribution line voltages measured by said voltage measurement units provided with each of said distributed generators and the amounts of reverse power flow that are caused to flow back to the electric power grid from each of said distributed generators.

10. The electric power grid control system according to claim 6, further comprising requesting, when the total voltage adjustment amount of said distributed generators reaches a predetermined maximum value, by said centralized control device, voltage suppression control to a group that is connected to a pole transformer that is downstream from a pole transformer in which the voltage deviation occurred.

* * * * *